(12) United States Patent
Dhanda et al.

(10) Patent No.: US 8,688,110 B1
(45) Date of Patent: Apr. 1, 2014

(54) APPARATUS AND METHOD FOR LIMITING SEARCHES FOR A HOME PLMN ACCORDING TO ITS PROXIMITY

(75) Inventors: Mungal Singh Dhanda, Slough (GB); Philip J. Children, Farnborough (GB); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 13/615,186

(22) Filed: Sep. 13, 2012

(51) Int. Cl.
*H04W 4/00* (2009.01)

(52) U.S. Cl.
USPC ........................................ 455/433; 455/432.1

(58) Field of Classification Search
USPC ........ 455/435.1, 432.1, 421, 422.1, 552, 433; 370/328, 329; 379/230
See application file for complete search history.

(56) References Cited

U.S. PATENT DOCUMENTS

| | | | | |
|---|---|---|---|---|
| 6,961,569 | B2 * | 11/2005 | Raghuram et al. | 455/435.1 |
| 7,519,365 | B2 | 4/2009 | Dorsey et al. | |
| 2006/0217153 | A1 * | 9/2006 | Coles et al. | 455/558 |
| 2007/0298795 | A1 * | 12/2007 | Zinn et al. | 455/435.1 |
| 2009/0258645 | A1 | 10/2009 | Ramkull et al. | |
| 2010/0020725 | A1 | 1/2010 | Ha et al. | |
| 2010/0167755 | A1 | 7/2010 | Kim et al. | |

OTHER PUBLICATIONS

3GPP TS 23.122 V5.2.0 (Dec. 2002) NAS Functions related to mobile station in idle mode (Release 5).*
3GPP TSG CN Plenary meeting #18—NP-020549—TSG CN WG 1—CRs to R99 and Rel-4 on work item TEI and TEI4 towards 23.*
Samsung India Software—A method of background scanning for a home PLMN in overlapping service areas of home PLMN and a visited PLMN.*
ETSI TS 100 930 v7.2.0 (Nov. 1999) Digital cellular telecommunications system (phase 2+) Functions related to mobile station in idle mode and group receive mode (GSM 03.22 version 7.2.0 Release 1998).*
ETSI TS 123 122 v6.5.0 (Jun. 2005) Digital cellular telecommunications system (phase 2+) Universal Mobile Telecommunications Systems (UMTS); Non-Access-S.*
3GPP TS 23.003, "Numbering, addressing and identification", Version 10.0.0, Release 10, Dec. 2010, pp. 1-77.
3GPP TS 23.122, "Non-Access-Stratum (NAS) functions related to Mobile Station in Idle mode", V10.2.0, Release 10, Dec. 2010, pp. 1-52.
3GPP TS 24.008, "Mobile radio interface Layer 3 specification; Core network protocols; stage 3" V10.1.0, Release 10, Dec. 2010, pp. 1-625.
3GPP TS 31.102, "Characteristics of the Universal Subscriber Identity Module (USIM) Application", V10.0.0, Release 10, Jan. 2011, pp. 1-214.

(Continued)

*Primary Examiner* — Nizar Sivji

(57) ABSTRACT

Apparatus and methods are disclosed for reducing or eliminating searches by a UE for its home PLMN when the mobile station is roaming in a network not in the vicinity of the home PLMN. That is, the UE may be provisioned with information about its home PLMN. For example, some embodiments can comprise a neighbor database indicating neighbor relationships between PLMNs and the home PLMN. This can enable a UE to determine whether the home PLMN is likely to be nearby when it is visiting a different PLMN. Forgoing a PLMN home search reduces processing and can aid in conserving power resources. Other aspects, embodiments, and features are also claimed and described.

24 Claims, 11 Drawing Sheets

(56) References Cited

OTHER PUBLICATIONS

3GPP TS 44.018, "Mobile radio interface layer 3 specification; Radio Resource Control (RRC) protocol", V9.8.0, Release 9, Mar. 2011, pp. 1-431.

3GPP TS 44.060 "Mobile Station (MS)—Bases Station System (BSS) interface; Radio Link Control /Medium Access Control (RLC/MAC) protocol", V10.4.0, Release 10, Mar. 2011, pp. 1-622.

3GPP TS 45.002, "Multiplexing and multiple access on the radio path", version 9.4.0, Release 9, Sep. 2010, pp. 1-112.

Ericsson, "Border problem and efficient periodic search", 3GPP TSG-CN-WG1, Meeting #17, Tdoc N1-010652, May 2001, pp. 1-3.

GSM MoU, SE.13, "Mobile Network Codes and Names", GSM Association, Apr. 2005, pp. 1-12.

ITU-T, List of Mobile Country or Geographical Area Codes, Geneva, Apr. 2010, pp. 1-16.

\* cited by examiner

Table 2
Example of mobile operator names and their corresponding MNC and MCC

| Operator Name | MCC | MNC | Country |
|---|---|---|---|
| MOVISTART | 748 | 7 | Uruguay |
| AIRCEL | 404 | 41 | India |
| Cingular | 344 | 930 | Antigua |
| MTN | 280 | 10 | Cyprus |
| AT&T | 310 | 150 | USA |
| AirTel | 404 | 49 | India |
| CHINA MOBILE | 460 | 0 | China |
| CHINA UNICOM | 460 | 1 | China |
| T-MOBILE | 310 | 260 | USA |
| Vodafone UK | 234 | 15 | UK |

Table 1
Example list of mobile country codes

| Country Name | MCC |
|---|---|
| Greece | 202 |
| Netherlands | 204 |
| Belgium | 206 |
| France | 208 |
| Germany | 262 |
| Monaco | 212 |
| Spain | 214 |
| Hungary | 216 |
| USA | 310 |
| Canada | 302 |
| Mexico | 334 |

*FIG. 8*

Table 3
Example neighbor database including MCCs and MNCs

| Serving Operator | | | Neighbor MCC & MNC |
|---|---|---|---|
| Name | MCC | MNC | |
| Vodafone | 234 | 15 | [234, 10], [234, 20], [234, 33], [234, 30], [234, 31], [234, 32] |
| O2 | 234 | 10 | [234, 15], [234, 20], [234, 33], [234, 30], [234, 31], [234, 32] |
| SFR | 208 | 13 | [208, 2], [208, 1], [208, 88], [206, 20], [206, 1], [206, 10], [270, 1], [270, 77], [270, 99], [262, 3], [262, 7], [262, 8], [262, 1], [262, 3] |
| AT&T | 310 | 150 | [310, 170], [310, 410], [310, 380], [310, 260], [310, 270], [302, 720], [302, 370], [334, 3], [334, 20], [250, 12], [250, 7], [250, 19] |

FIG. 9

*Table 4*

Example neighbor database including MCCs

| Serving Country Name | MCC | Neighbor MCC |
|---|---|---|
| Greece | 202 | 220, 276, 284, 286 |
| Netherlands | 204 | 206, 262 |
| Belgium | 206 | 204, 262, 208 |
| France | 208 | 206, 270, 262, 228, 222, 232, , 214 |
| Germany | 262 | 204, 206, 208, 238, 260, 230, 232, 222 |
| USA | 310 | 302, 334, 250 |
| Canada | 302 | 310, 311, 312, 313, 314, 315, 316, |
| Mexico | 334 | 310, 311, 312, 313, 314,315, 316, 702, 704 |
| Hungry | 216 | 231, 255, 226, 220, 218, 219, 293, 232 |

*FIG. 10*

APPARATUS AND METHOD FOR LIMITING SEARCHES FOR A HOME PLMN ACCORDING TO ITS PROXIMITY

TECHNICAL FIELD

Embodiments of the present invention relate generally to wireless communication systems, and more particularly, to home PLMN searches while roaming.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

In a wireless communication network, roaming is a term used where a mobile station visits a network that is not its home PLMN (public land mobile network). The visited network is frequently referred to as a VPLMN (V being visited). The visited network may or may not belong to the same country as the home PLMN.

The identity of a network is generally provided by PLMN ID. A PLMN ID generally includes a combination of a mobile country code (MCC) and a mobile network code (MNC). The GSMA maintains a definitive list of PLMN IDs used worldwide, where each 3GPP-compliant mobile network is identified by its MCC and MNC. Each cell in such a mobile network broadcasts its MCC and MNC so that a mobile station can identify which network it is in. Generally, each country utilizes one (or in some cases, more than one) country code, and many countries typically have several networks and therefore several MNCs. Within a MCC, each mobile network has a unique MNC.

When a mobile station is roaming, that is, when it is registered on a VPLMN, it generally uses one of several algorithms to periodically search for its home PLMN. This is because although the mobile station is registered on the best cell according to signal characteristics, if the mobile station is nearby its home PLMN, e.g., near a border, for various reasons including the increased charges to the user for voice or data calls, it would be preferable for the mobile station to register on its home PLMN. For example, the mobile may search for its home PLMN at regular, fixed intervals, or it may search at longer and longer intervals over time, as it comes to determine that the success of the search is less likely as it continues to fail.

Searching for the home PLMN while registered on a VPLMN generally includes processes such as measuring the power received on all the supported frequencies/bands to establish an available cell list, and reading the identity of each cell to determine its PLMN ID until the home PLMN ID is found or the available cell list is exhausted. These processes consume a considerable amount of power. Thus, each time the mobile searches for the home PLMN, power consumption at the mobile is increased, particularly when the mobile is in an idle or standby mode.

However, when the home PLMN is not in the vicinity of the VPLMN serving the mobile station, there may be little to no possibility that the search processes would find the home PLMN. For example, a mobile station having a home network in the United States, when registered on a network in Australia, would necessarily fail in a search for its home PLMN. Thus, such a search for the home PLMN in this scenario would be a waste of power that would be advantageous to avoid.

Others have attempted to address this issue by configuring the network to transmit information to the mobile station whether the VPLMN is within the vicinity of the mobile station's HPLMN. Here, if the VPLMN is not in the vicinity of the HPLMN, scanning and searching for the HPLMN may be eliminated. For example, Ericsson published a document titled, "Border problem and efficient periodic search," presented at 3GPP TSG-CN-WG1, Meeting #17. In this document, Ericsson disclosed a procedure of transmitting a neighbor PLMN list using signaling mechanisms (i.e., via broadcast messages, registration messages, or LA/RA updates). However, this solution required transmission of the neighbor PLMN list to the mobile station at the demand of the network, rather than the mobile station; and further, by requiring transmission from the network, required changes to the standards that define communication over the air interface.

As the demand for mobile broadband access continues to increase, research and development continue to advance the wireless technologies not only to meet the growing demand for mobile broadband access, but to advance and enhance the user experience with mobile communications.

BRIEF SUMMARY OF SOME EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a user equipment (UE). Here, the method includes registering on a visited public land mobile network (VPLMN), determining if the VPLMN is a neighbor of a home public land mobile network (home PLMN) for the UE, in accordance with a neighbor database stored at the mobile station, and forgoing to search for the home PLMN while remaining registered on the VPLMN if the neighbor database indicates that the VPLMN is not a neighbor of the home PLMN for the UE.

Another aspect of the disclosure provides a method of wireless communication operable at a network entity. Here, the method includes storing a neighbor database that includes PLMN ID information for a plurality of networks and neighbor information for each PLMN ID entry in the neighbor database. The method further includes transmitting the neighbor database to a UE utilizing one of NAS registration messaging or OMA device management signaling.

Another aspect of the disclosure provides a UE configured for wireless communication, including at least one processor, a memory coupled to the at least one processor, a transmitter coupled to the at least one processor, and a receiver coupled to the at least one processor. Here, the at least one processor is configured to register on a VPLMN, to determine if the VPLMN is a neighbor of a home public land mobile network (home PLMN) for the UE, in accordance with a neighbor database stored at the mobile station, and to forgo to search for the home PLMN while remaining registered on the VPLMN if the neighbor database indicates that the VPLMN is not a neighbor of the home PLMN for the UE.

Another aspect of the disclosure provides a network entity configured for wireless communication, including at least one processor, a memory coupled to the at least one processor, and a communication interface coupled to the at least one processor. Here, the at least one processor is configured to store a neighbor database including PLMN ID information for a plurality of networks and neighbor information for each PLMN ID entry in the neighbor database. The at least one processor is further configured to transmit the neighbor database to a UE utilizing one of NAS registration messaging or OMA device management signaling.

Another aspect of the disclosure provides a UE configured for wireless communication, including means for registering on a VPLMN, means for determining if the VPLMN is a neighbor of a home PLMN for the UE, in accordance with a neighbor database stored at the mobile station, and means for forgoing to search for the home PLMN while remaining registered on the VPLMN if the neighbor database indicates that the VPLMN is not a neighbor of the home PLMN for the UE.

Another aspect of the disclosure provides a network entity configured for operation in a wireless communication network, including means for storing a neighbor database including PLMN ID information for a plurality of networks and neighbor information for each PLMN ID entry in the neighbor database. The network entity further includes means for transmitting the neighbor database to a UE utilizing one of NAS registration messaging or OMA device management signaling.

Another aspect of the disclosure provides a computer program product operable at a UE configured for wireless communication, including a computer-readable storage medium having instructions for causing a computer to register on a VPLMN, instructions for causing a computer to determine if the VPLMN is a neighbor of a home PLMN for the UE, in accordance with a neighbor database stored at the mobile station, and instructions for causing a computer to forgo to search for the home PLMN while remaining registered on the VPLMN if the neighbor database indicates that the VPLMN is not a neighbor of the home PLMN for the UE.

Another aspect of the disclosure provides a computer program product operable at a network entity configured for use in a wireless communication network, including a computer-readable storage medium having instructions for causing a computer to store a neighbor database including PLMN ID information for a plurality of networks and neighbor information for each PLMN ID entry in the neighbor database. The computer-readable storage medium further includes instructions for causing a computer to transmit the neighbor database to a UE utilizing one of NAS registration messaging or OMA device management signaling.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 shows two tables illustrating portions of PLMN IDs utilized in a 3GPP network.

FIGS. 9-10 include tables showing structure for a neighbor database according to some examples.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure provide a search algorithm that reduces or eliminates searches by a mobile station for its home PLMN when the mobile station is roaming in a network not in the vicinity of the home PLMN. That is, the mobile station may be provisioned with information about its home PLMN, such that it can determine whether the home PLMN is likely to be nearby when it is visiting a different PLMN.

Figure 1:
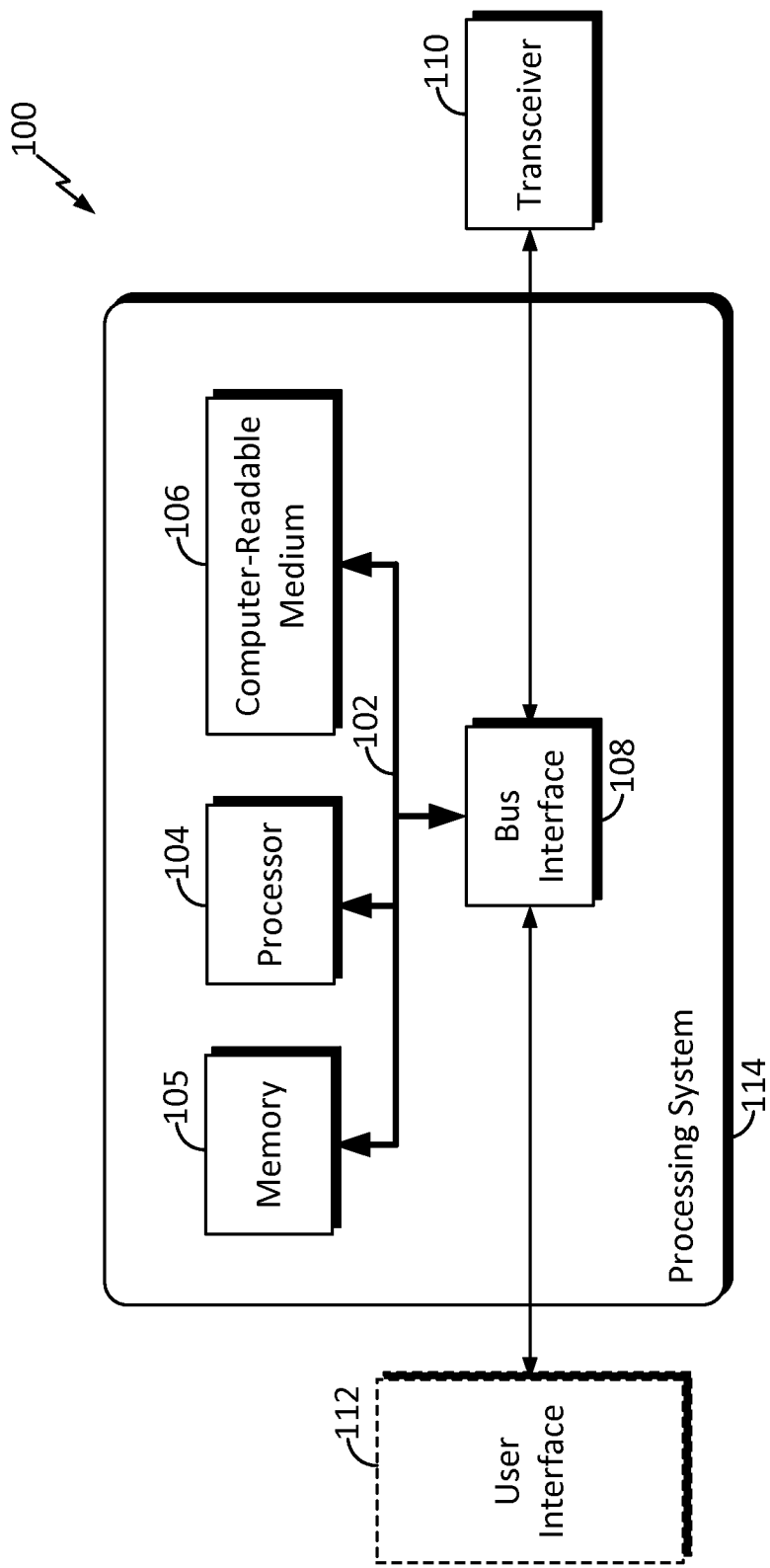
FIG. 1 is a block diagram illustrating an example of a hardware implementation for an apparatus employing a processing system.

FIG. 1 is a conceptual diagram illustrating an example of a hardware implementation for an apparatus 100 (e.g., a user equipment) employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
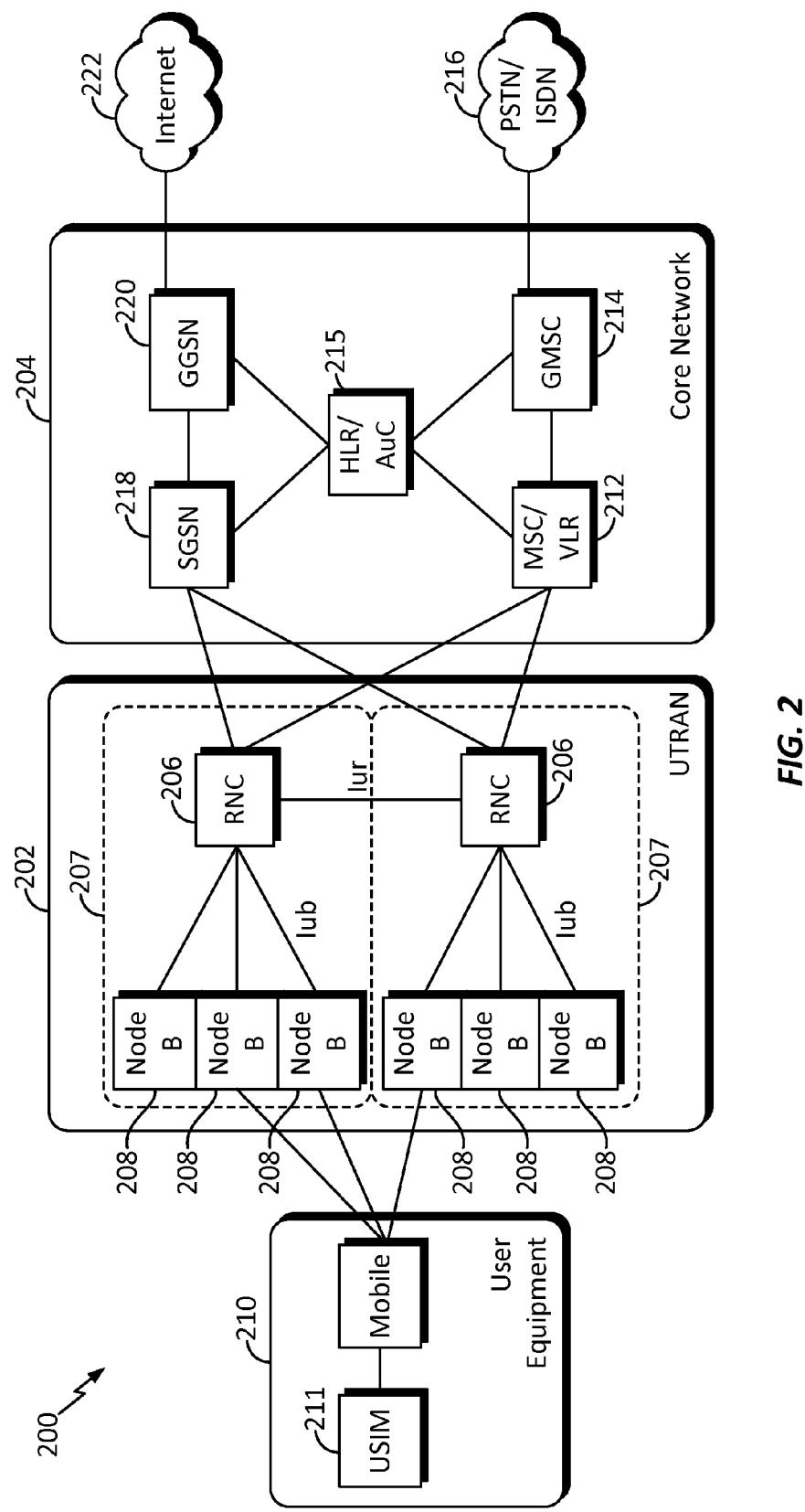
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
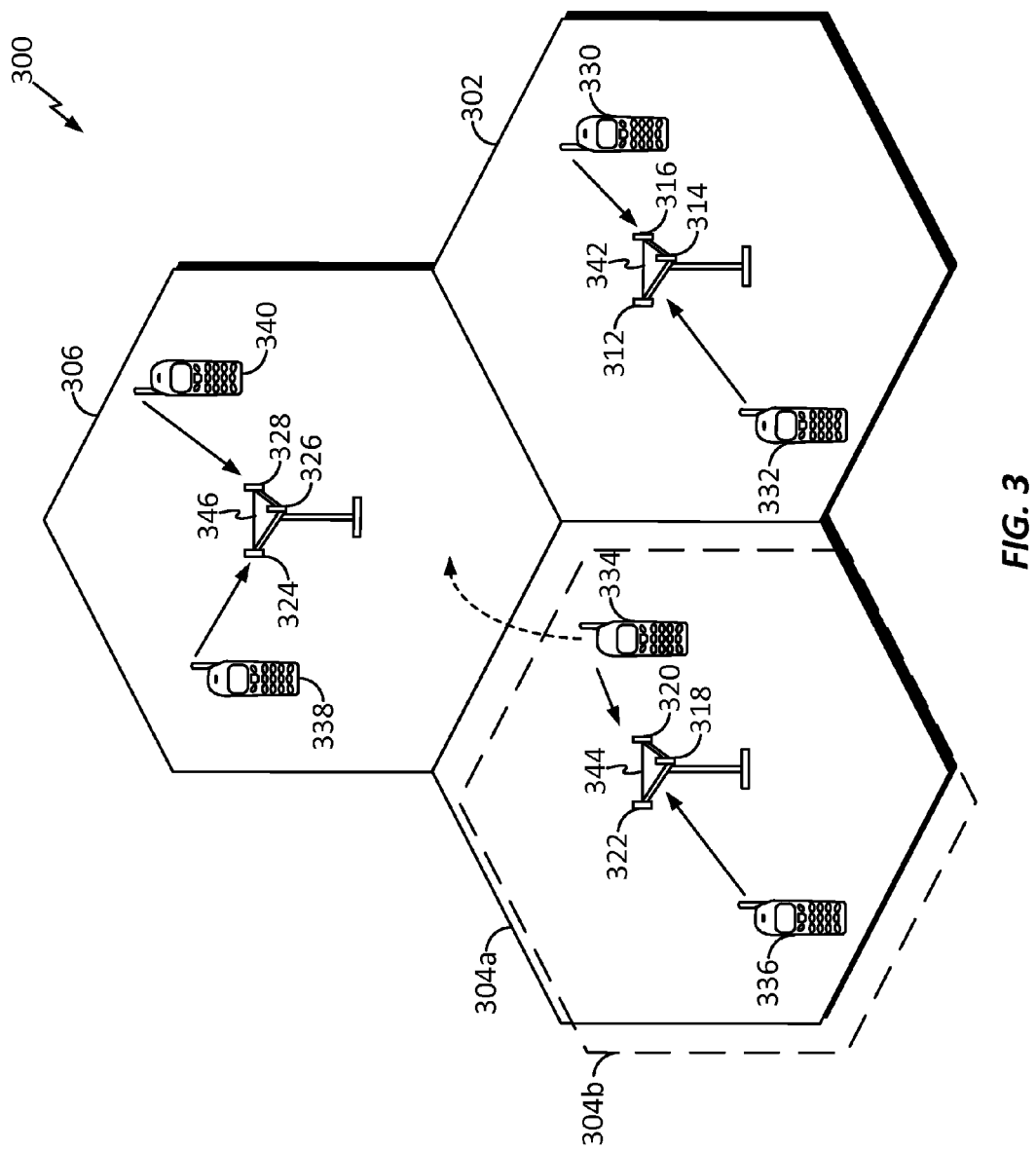
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
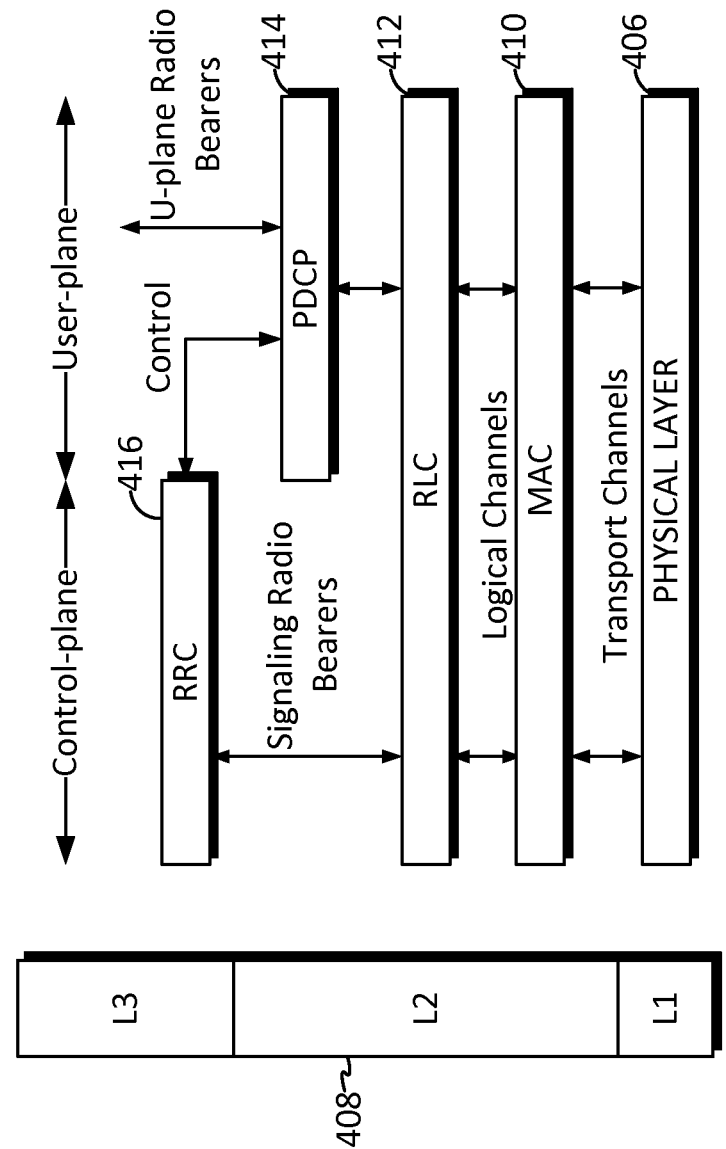
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
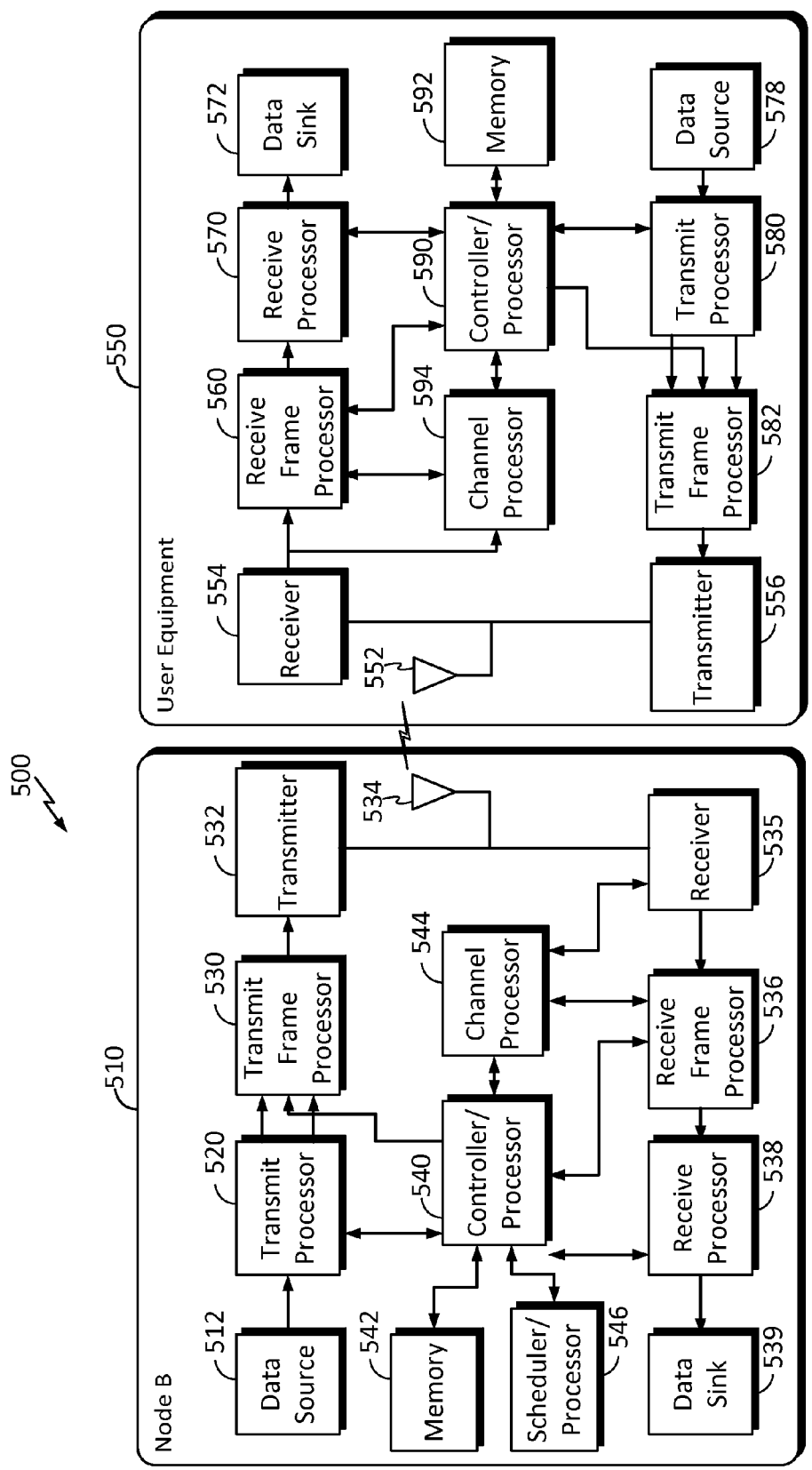
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

As described above, a UE 550 may register on a public land mobile network (PLMN) for wireless communication. A PLMN is generally identified by a PLMN ID, which may include a combination of a mobile country code (MCC) and a mobile network code (MNC). The GSMA maintains a list of PLMN IDs and generally, each country utilizes one (or in some cases, more than one) country code, and many countries typically have several networks and therefore several MNCs.

Table 1 shows an exemplary list of mobile country codes (MCCs) for a small set of countries. While the illustrated countries each include a single three-digit MCC, within the scope of the present disclosure, any number of MCCs may correspond to a particular country, and an MCC may be of any suitable length.

Typically all mobile networks within a country share the same MNC, but each one generally has its own MNC. In some larger countries, more than one MCC may be utilized to indicate the same country.

Table 2 shows an example of certain mobile operators' names, along with their corresponding MCC and MNC. As seen, each operator in the table is identified with a particular combination of MCC and MNC, although within the scope of the present disclosure, any number of combinations of MCC and MNC may correspond to a particular operator.

A UE 550 is generally configured to have a home PLMN (HPLMN). The UE 550 may include a list stored in its USIM 211 and/or in a memory 592 including its HPLMN ID and an equivalent HPLMN (EHPLMN) list. That is, the UE 550 may be enabled to register on more than one PLMN as a home PLMN: thus, there may be one or more EHPLMN for a particular UE. In the present disclosure, when reference is made to a home PLMN, this is intended to refer to either one of the HPLMN or the EHPLMN.

Various aspects of the present disclosure provide an apparatus and method for saving power at a UE 550 when roaming. For example, the algorithm used for searching for the home PLMN when roaming at a VPLMN may be adapted to search for the home PLMN only when there is some probability of finding the home PLMN.

To this end, according to some aspects of the disclosure, the UE 550 may store a neighbor database, e.g., including list of one or more of neighbor mobile country codes (MCC) or mobile network codes (MNC) of PLMNs that are in the vicinity of the home PLMN. Here, a neighboring PLMN may be one that is adjacent to the home PLMN, nearby the home PLMN, or in any proximity that an operator may determine suitable for designating as a neighbor.

This way, when the mobile station is roaming in a location that is known not to be in the vicinity of the home PLMN, then the mobile station can forgo searching for the home PLMN. For example, when a UE 550 having its HPLMN in the United States is registered on a VPLMN in Australia, it may forgo the search for its HPLMN. However, if the VPLMN has a PLMN ID in the list of neighbor PLMNs, there is a possibility the user is in a border region and a search for the home PLMN might yield some success. For example, if a UE 550 having its HPLMN in France is registered on a VPLMN in Italy, it may be in a border region and thus, it may undergo a search for its HPLMN. In this case, the search for the home PLMN can take place using a conventional algorithm, e.g., searching at periodic, fixed intervals or at intervals that get longer over time.

Table 3 illustrates an example of how a neighbor database might be structured in accordance with some aspects of the present disclosure. For this illustration, four networks are illustrated, some of which are neighbors with one another, and some of which are not neighbors. In Table 3, the operator's name, country code (MCC), and network code (MNC) are included, as well as an associated list of the MCC and MNC for all neighbor networks within a proximity to the operator's network. While Table 3 is very small, only showing information for four different operators, a database may be created and provisioned within a UE 550 including the illustrated information, but including, for example, all operators in the world, or any suitable number of operators.

Table 4 provides another example of a neighbor database utilizing neighbor MCCs while omitting MNC information. In this way, because some countries might have quite a large number of MNCs, memory space at the UE 550 may be preserved by utilizing a smaller database. That is, when a neighbor database includes listings for a large number of PLMNs, including all neighboring PLMN ID information for all neighboring PLMNs can begin to consume a substantial amount of memory space. Thus, such an example limiting the neighbor information to MCCs only, may be suitable when memory is limited at the USIM 211/memory 592, or wherever the neighbor database may be stored in a particular example. Moreover, because MCCs change relatively seldom, e.g., when a new country is created or when a country acquires an additional MCC, update of the neighbor database may be very infrequent or potentially not utilized.

In another example, a UE 550 might only store a portion of the neighbor database corresponding to the country in which the UE 550 will be sold, or the country of the home PLMN. This way, the UE might need only compare the PLMN ID of the VPLMN with the list of neighbor PLMNs neighboring the home PLMN. This can reduce the amount of memory required for the neighbor database.

Of course, these are merely examples of a neighbor database that might be used in some aspects of the present disclosure, and the structure of a database in a particular implementation within the scope of the present disclosure is not limited to these examples.

Figure 6A:
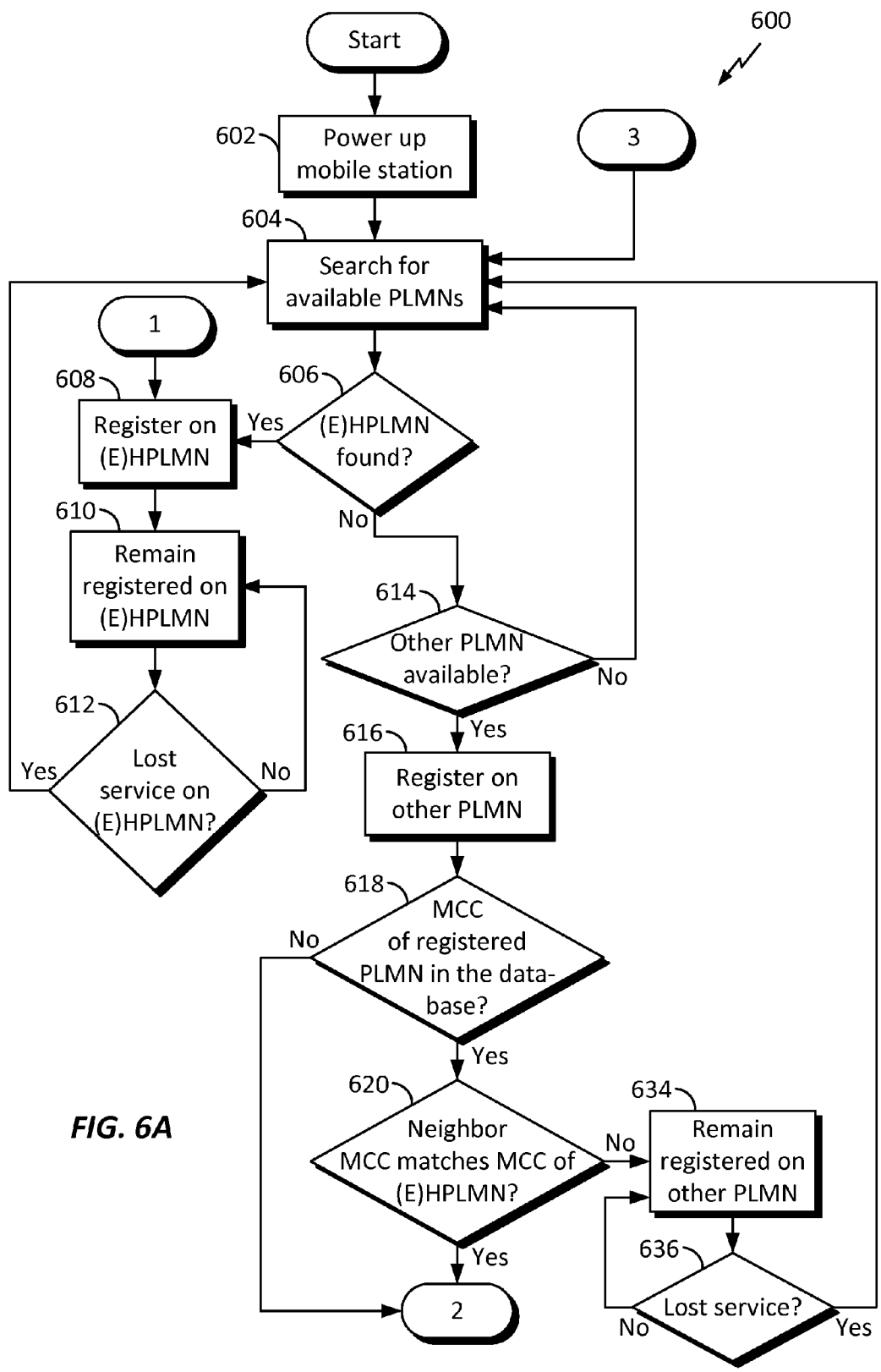
FIGS. 6A and 6B are a flow chart illustrating one example of a process of forgoing home PLMN searches when visiting a VPLMN not in the vicinity of the home PLMN.
Figure 6B:
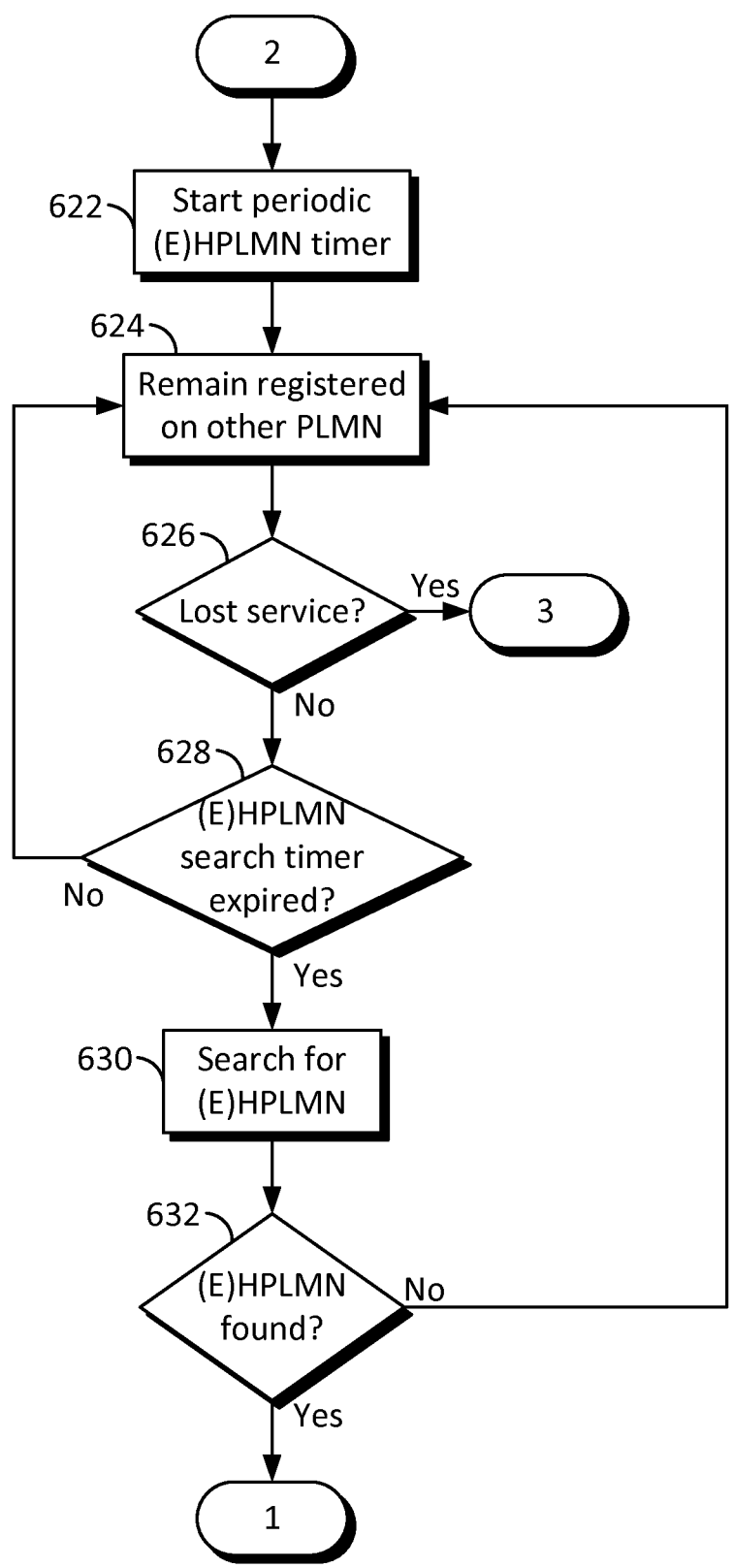

FIGS. 6A and 6B are a flow chart illustrating an exemplary process 600 for searching PLMNs in accordance with some aspects of the present disclosure. In some examples, the process 600 may be implemented by an apparatus 100 including a processing system 114; a UE 210 and/or a UE 550; or any other suitable apparatus or means for performing the recited functions.

In the illustrated example, the process begins at step 602 with a powering up of the UE 550. Power-up of the UE 550 is only utilized as one example of a scenario when a search as described herein may occur; however, those of ordinary skill in the art will comprehend that various aspects of the disclosure may be implemented in other scenarios not explicitly described herein that utilize a PLMN search.

At step 604, the UE 550 may search the radio channel for available PLMNs. The details of the search at step 604 are known to those of ordinary skill in the art, and are therefore not described in detail in the present disclosure.

At step 606, the UE 550 may determine whether its home PLMN was found in the search conducted at step 604. For example, a list of PLMNs identified in the search may be compared to at least a portion of the PLMN ID corresponding to one or more of the HPLMN or the EHPLMN(s). If yes, then the UE 550 may proceed to step 608 and register on the home PLMN found in the search. Step 610 is illustrated essentially as a placeholder indicating that the UE 550 may remain registered on the home PLMN described in block 608. At block 612, the UE 550 may determine whether service was lost on the home PLMN. If no, then the process returns to step 610, such that the UE 550 remains registered on the home PLMN. If, on the other hand, the UE 550 determines at step 612 that service has been lost on the home PLMN, the process may return to step 604 wherein the UE 550 may search for available PLMNs.

Returning now to step 606, if the UE 550 does not find the home PLMN during the search performed at step 604, then the process may proceed to step 614, wherein the UE 550 may determine what, if any, other PLMNs are available from the search performed at step 604. If no other PLMNs are available, then service is not available for the UE 550; and thus, the process may return to step 604, wherein the UE 550 may perform another search for available PLMNs. If, on the other hand, there are one or more PLMNs available other than the home PLMN, the process may proceed to block 616, wherein the UE 550 may register on a network having the available PLMN. Here, as described above, the PLMN on which the UE 550 registers at step 616 may be referred to as a VPLMN.

At step 618, the UE 550 may determine whether at least a portion of the PLMN ID of the PLMN to which the UE 550 registered at step 616 (i.e., the VPLMN) corresponds to an entry in the neighbor database stored at the UE 550. For example, the mobile country code (MCC), the mobile network code (MNC), and/or any other portion of the PLMN ID of the VPLMN may correspond to an entry in the neighbor database. If no, then the process may proceed to step 622, described in further detail below. If yes, then the process may proceed to step 620, wherein the UE 550 may determine whether a neighbor PLMN corresponding to the VPLMN in the neighbor database is one of the HPLMN or a EHPLMN. For example, in a neighbor database including MCC entries only, as illustrated in Table 4, the UE 550 may determine whether a neighbor MCC in the same row as the MCC of the VPLMN corresponds to an MCC of the home PLMN of the UE 550. In another example, in a neighbor database including MCC and MNC entries as illustrated in Table 3, the UE 550 may determine whether a neighbor MCC/MNC combination in the same row as the MCC/MNC combination of the VPLMN corresponds to a home PLMN of the UE 550.

If, at step 620, the UE 550 determines that the neighbor PLMN ID corresponds to a home PLMN of the UE 550, then the process may proceed to step 622 (see FIG. 6B), and begin a search for a home PLMN. That is, if the VPLMN does not appear in the neighbor database (determined at step 618), or if the VPLMN is a neighbor of a home PLMN according to the neighbor database (determined at step 620), the UE 550 may initiate a search for the home PLMN. Searching for the home PLMN when the VPLMN does not appear in the neighbor database (as determined at step 618) is an option that might be utilized to cover the possibility that the VPLMN is a neighbor of a home PLMN even though it does not appear in the database. For example, this may occur when the VPLMN corresponds to a new network or new country code that is not in the database.

At step 622, the UE 550 may start a timer for timing home PLMN searches. At step 624, which is essentially a placeholder block, the UE 550 may remain registered on the VPLMN. At step 626, the UE 550 may determine whether it has lost service on the VPLMN. If the UE 550 loses service, then the process may return to step 604 to perform a search for available PLMNs. On the other hand, if at step 626 the UE 550 determines that it has not lost service and therefore remains registered on the VPLMN, the process may proceed to step 628, wherein the UE 550 may determine whether the timer for timing home PLMN searches started at step 622 has expired. If the timer is not yet expired, then the process may return to block 624 and remain registered on the VPLMN. On the other hand, if the timer is expired, then the process may proceed to step 630, wherein the UE 550 may search for a home PLMN. Such a search may be the same as a conventional search for the home PLMN performed by a conventional UE when roaming at a VPLMN. At step 632, if a home PLMN is found, the process may proceed to step 608, as described above, wherein the UE 550 may register on the home PLMN. On the other hand, if a home PLMN is not found at step 632, then the process may return to step 624, wherein the UE 550 may remain registered on the VPLMN.

In some aspects of the present disclosure, the process between steps 622 and 632 may be the same as the search for a home PLMN performed by a conventional UE in all cases when that UE is roaming at a VPLMN. However, in some aspects of the disclosure, the timer for timing home PLMN searches may be configured to accelerate home PLMN searches when it is known that the VPLMN is a neighbor of a home PLMN. In this way, a home PLMN may be located more quickly when it is known that there is a greater probability that it may be found.

Thus, as described above, steps 622-632 may be the same or similar to a conventional search for the home PLMN as performed when a conventional UE is roaming, i.e., registered on a VPLMN. However, as described above, in an aspect of the present disclosure, such a search may be limited to a scenario where the VPLMN does not appear in the neighbor database or when the neighbor database indicates that the VPLMN is a neighbor of the home PLMN. On the other hand, returning to step 620, in an aspect of the present disclosure, if the neighbor database indicates that the VPLMN is not a neighbor of the home PLMN, then the process may proceed to step 634, and remain registered on the VPLMN while forgoing searching for a home PLMN. That is, because the PLMN ID of the VPLMN appears in the neighbor database (determined at step 618) and at step 636, the UE 550 may determine whether service at the VPLMN was lost; if no, the process may return to step 634 and remain registered on the VPLMN; if yes, the process may return to step 604 and initiate a search for available PLMNs as described above.

Thus, according to various aspects of the present disclosure, the UE 550 may search for its home PLMN more frequently when the UE 550 is in the vicinity of the home PLMN, and can stop this searching when it is not in the vicinity. This solution has advantages for both cases, i.e., it can find its home PLMN faster when it is in the vicinity but can stop wasting energy when it is not in the vicinity.

Moreover, according to aspects of the present disclosure, the UE 550 may determine whether the VPLMN is a neighbor of a home PLMN without need for network support, i.e., by utilizing a self-contained neighbor database that is locally stored at the UE 550. Here, the neighbor database may be accessed by the UE 550 on demand without signaling the network.

Figure 7:
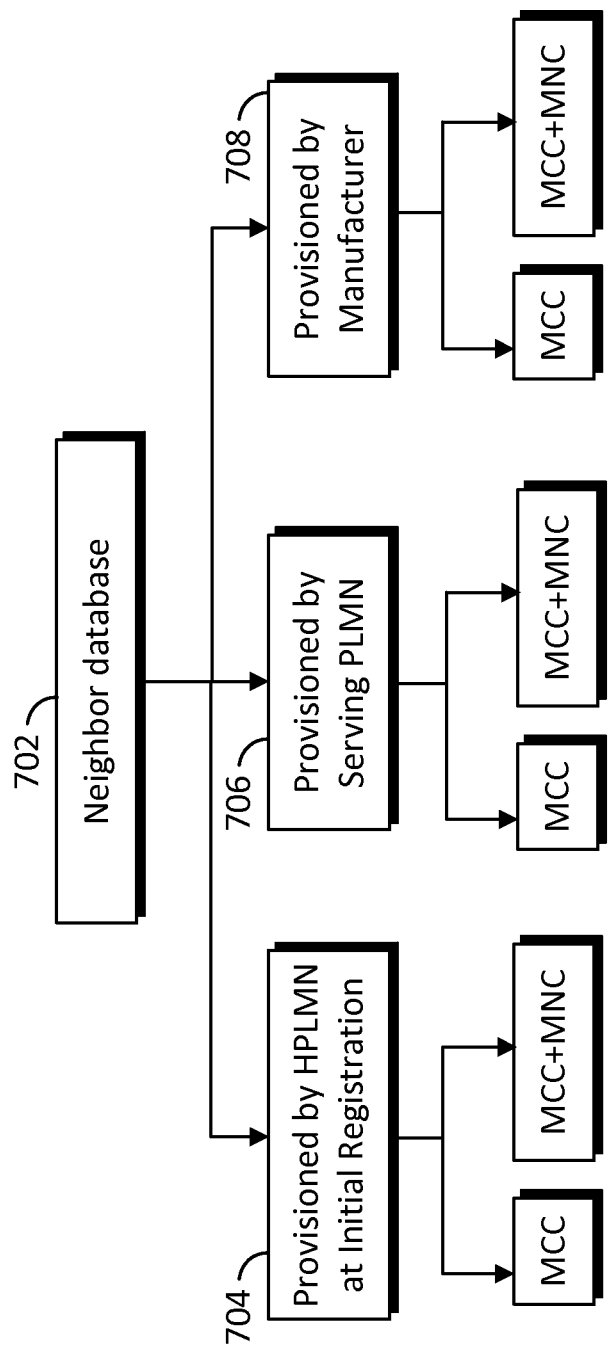
FIG. 7 is a schematic diagram illustrating three exemplary procedures for provisioning a UE with a neighbor database.

FIG. 7 is a schematic diagram that illustrates a further aspect of the disclosure, wherein the UE 550 may be provisioned with the neighbor database 702, which may include the stored list of MCCs and MNCs, by utilizing one or more provisioning algorithms. Herein below, three exemplary procedures are described for provisioning the UE 550 with such a database, and in various aspects of the disclosure, these three procedures may be utilized alone or in combination. Of course, any other suitable procedures for provisioning the UE 550 with such a database may be utilized within the scope of the present disclosure.

In one example, as shown at block 704, the UE 550 may be provisioned with the neighbor database 702 during initial registration (i.e., the first time the UE 550 is powered on). For example, the HPLMN may provide this database to the UE 550 during registration messaging when a UE 550 with a new subscription is powered on for the first time. Here, this neighbor database 702 can then be stored on the USIM 211, or in a non-volatile memory (e.g., the memory 592) within the UE 550.

In another example, as shown at block 706, the serving network (i.e., the VPLMN when the UE is roaming, or the HPLMN when the UE 550 registers on its home network) may provision the UE 550 with the neighbor database 702 at any suitable time. Here, the provisioning of the neighbor database 702 to the UE 550 may occur, for example, during registration (e.g., at the initiation of a connection such as at power-on or handover to the serving PLMN). For example, referring once again to FIG. 6, the database may be provisioned to the UE 550 during step 616 and/or step 608. In some examples this messaging during registration of the UE 550 may be utilized to update an initial registration provisioned upon initial power-on, as described above. In this example, any suitable registration messaging may be utilized to provide the neighbor database 702, including but not limited to Attach, Location Update, Routing Area Update, or Tracking Area Update.

In another example, the provisioning of the neighbor database 702 to the UE 550 in block 706 may be accomplished utilizing signaling protocols defined by the Open Mobile Alliance (OMA), referred to as OMA device management signaling. OMA device management signaling is known to those of ordinary skill in the art, and may be conventionally utilized for configuring mobile devices such as the UE 550. Thus, by utilizing OMA device management signaling to provision the UE 550 with the neighbor database 702, although additional signaling relative to existing specifications would be utilized, the changes would be relatively small and relatively easily implemented.

In another example, as shown at block 708, the UE 550 may be provisioned with a permanent (or semi-permanent) database, which may include all the known PLMN IDs in the world at the time of provisioning, or any suitable portion of the set of worldwide PLMN IDs. For example, a non-volatile memory at the UE 550 may be configured to store a database of PLMN IDs during manufacturing of the UE 550, at a retail location, or at any time prior to the deployment of the UE 550 to its user. Provisioning the UE 550 with the database prior to deployment is a relatively easy option for a mobile network, since it does not require any changes to air interface standards or network support. However, this option does suffer from a disadvantage, in that without update by the network, the database can eventually become out of date as new networks having new PLMN IDs are deployed. Thus, some aspects of the present disclosure may be capable of updating the database with new information as described above, e.g., at the initial registration of the UE 550 and/or when registering on a PLMN.

Some examples may utilize a combination of two or more of the above three provisioning algorithms within the scope of the present disclosure.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), the method comprising:
 registering on a visited public land mobile network (VPLMN);
 determining if the VPLMN is a neighbor of a home public land mobile network (home PLMN) for the UE, in accordance with a neighbor database stored at the mobile station; and
 forgoing to search for the home PLMN while remaining registered on the VPLMN if the neighbor database indicates that the VPLMN is not a neighbor of the home PLMN for the UE,
 wherein the determining if the VPLMN is a neighbor of the home PLMN for the UE comprises:

determining if at least a portion of a PLMN ID of the VPLMN is stored in the neighbor database; and if the portion of the PLMN ID is stored in the neighbor database, determining if a location identifier of the home PLMN corresponds to a neighbor of the VPLMN.

2. The method of claim 1, wherein the location identifier comprises a mobile country code (MCC).

3. The method of claim 1, wherein the at least a portion of the PLMN ID of the VPLMN comprises a mobile country code (MCC).

4. The method of claim 1, wherein the at least a portion of the PLMN ID of the VPLMN comprises a mobile network code (MNC).

5. The method of claim 1, further comprising:
provisioning a non-volatile memory at the UE with the neighbor database prior to deployment to a user of the UE.

6. The method of claim 1, further comprising:
receiving the neighbor database utilizing network signaling at registration of the UE with the home PLMN.

7. The method of claim 1, further comprising:
receiving the neighbor database utilizing network signaling at a registration of the UE with a PLMN other than the home PLMN.

8. The method of claim 1, further comprising:
receiving the neighbor database utilizing OMA device management signaling.

9. The method of claim 1, wherein the determining if the VPLMN is a neighbor of the HPLMN for the UE comprises:
determining if a mobile country code (MCC) or a mobile network code (MNC) corresponding to the VPLMN is stored in the neighbor database.

10. The method of claim 1, wherein the home PLMN comprises one of a HPLMN or an EPLMN.

11. A method of wireless communication operable at a network entity, comprising:
storing a neighbor database comprising:
PLMN ID information for a plurality of networks; and
neighbor information for each PLMN ID entry in the neighbor database; and
transmitting the neighbor database to a user equipment (UE) utilizing one of NAS registration messaging or OMA device management signaling,
wherein the transmitting the neighbor database to the UE comprises enabling the UE to determine if a visited public land mobile network (VPLMN) is a neighbor of a home public land mobile network (home PLMN) for the UE, in accordance with the neighbor database,
wherein the enabling the UE to determine if the VPLMN is a neighbor of the home PLMN for the UE comprises:
enabling the UE to determine if at least a portion of a PLMN ID of the VPLMN is stored in the neighbor database; and
if the portion of the PLMN ID is stored in the neighbor database, enabling the UE to determine if a location identifier of the home PLMN corresponds to a neighbor of the VPLMN.

12. A user equipment (UE) configured for wireless communication, comprising:
at least one processor;
a memory coupled to the at least one processor;
a transmitter coupled to the at least one processor; and
a receiver coupled to the at least one processor,
wherein the at least one processor is configured to:
register on a visited public land mobile network (VPLMN);
determine if the VPLMN is a neighbor of a home public land mobile network (home PLMN) for the UE, in accordance with a neighbor database stored at the mobile station; and
forgo to search for the home PLMN while remaining registered on the VPLMN if the neighbor database indicates that the VPLMN is not a neighbor of the home PLMN for the UE,
wherein the at least one processor, being configured to determine if the VPLMN is a neighbor of the home PLMN for the UE, is further configured to:
determine if at least a portion of a PLMN ID of the VPLMN is stored in the neighbor database; and
if the portion of the PLMN ID is stored in the neighbor database, determine if a location identifier of the home PLMN corresponds to a neighbor of the VPLMN.

13. The UE of claim 12, wherein the at least a portion of the PLMN ID of the VPLMN comprises a mobile country code (MCC).

14. The UE of claim 12, wherein the at least a portion of the PLMN ID of the VPLMN comprises a mobile network code (MNC).

15. The UE of claim 12, wherein the at least one processor is further configured to:
provision a non-volatile memory at the UE with the neighbor database prior to deployment to a user of the UE.

16. The UE of claim 12, wherein the at least one processor is further configured to:
receive the neighbor database utilizing network signaling at registration of the UE with the home PLMN.

17. The UE of claim 12, wherein the at least one processor is further configured to:
receive the neighbor database utilizing network signaling at a registration of the UE with a PLMN other than the home PLMN.

18. The UE of claim 12, wherein the at least one processor is further configured to:
receive the neighbor database utilizing OMA device management signaling.

19. The UE of claim 12, wherein the at least one processor, being configured to determine if the VPLMN is a neighbor of the HPLMN for the UE, is further configured to:
determine if a mobile country code (MCC) or a mobile network code (MNC) corresponding to the VPLMN is stored in the neighbor database.

20. A network entity configured for wireless communication, comprising:
at least one processor;
a memory coupled to the at least one processor; and
a communication interface coupled to the at least one processor,
wherein the at least one processor is configured to:
store a neighbor database comprising:
PLMN ID information for a plurality of networks; and
neighbor information for each PLMN ID entry in the neighbor database; and
transmit the neighbor database to a user equipment (UE) utilizing one of NAS registration messaging or OMA device management signaling,
wherein the transmitting the neighbor database to the UE comprises enabling the UE to determine if a visited public land mobile network (VPLMN) is a neighbor of a home public land mobile network (home PLMN) for the UE, in accordance with the neighbor database,
wherein the enabling the UE to determine if the VPLMN is a neighbor of the home PLMN for the UE comprises:

enabling the UE to determine if at least a portion of a PLMN ID of the VPLMN is stored in the neighbor database; and if the portion of the PLMN ID is stored in the neighbor database, enabling the UE to determine if a location identifier of the home PLMN corresponds to a neighbor of the VPLMN.

21. A user equipment (UE) configured for wireless communication, comprising:

means for registering on a visited public land mobile network (VPLMN);

means for determining if the VPLMN is a neighbor of a home public land mobile network (home PLMN) for the UE, in accordance with a neighbor database stored at the mobile station; and means for forgoing to search for the home PLMN while remaining registered on the VPLMN if the neighbor database indicates that the VPLMN is not a neighbor of the home PLMN for the UE, wherein the means for determining if the VPLMN is a neighbor of the home PLMN for the UE comprises:

means for determining if at least a portion of a PLMN ID of the VPLMN is stored in the neighbor database; and if the portion of the PLMN ID is stored in the neighbor database, means for determining if a location identifier of the home PLMN corresponds to a neighbor of the VPLMN.

22. A network entity configured for operation in a wireless communication network, comprising:

means for storing a neighbor database comprising:
PLMN ID information for a plurality of networks; and
neighbor information for each PLMN ID entry in the neighbor database; and means for transmitting the neighbor database to a user equipment (UE) utilizing one of NAS registration messaging or OMA device management signaling wherein the means for transmitting the neighbor database to the UE comprises means for enabling the UE to determine if a visited public land mobile network (VPLMN) is a neighbor of a home public land mobile network (home PLMN) for the UE, in accordance with the neighbor database, wherein the means for enabling the UE to determine if the VPLMN is a neighbor of the home PLMN for the UE comprises:

means for enabling the UE to determine if at least a portion of a PLMN ID of the VPLMN is stored in the neighbor database; and if the portion of the PLMN ID is stored in the neighbor database, means for enabling the UE to determine if a location identifier of the home PLMN corresponds to a neighbor of the VPLMN.

23. A computer program product operable at a user equipment (UE) configured for wireless communication, comprising:

a non-transitory computer-readable storage medium comprising:

instructions for causing a computer to register on a visited public land mobile network (VPLMN);

instructions for causing a computer to determine if the VPLMN is a neighbor of a home public land mobile network (home PLMN) for the UE, in accordance with a neighbor database stored at the mobile station; and instructions for causing a computer to forgo to search for the home PLMN while remaining registered on the VPLMN if the neighbor database indicates that the VPLMN is not a neighbor of the home PLMN for the UE, wherein the instructions for causing a computer to determine if the VPLMN is a neighbor of the home PLMN for the UE comprises:

instructions for causing a computer to determine if at least a portion of a PLMN ID of the VPLMN is stored in the neighbor database; and if the portion of the PLMN ID is stored in the neighbor database, instructions for causing a computer to determine if a location identifier of the home PLMN corresponds to a neighbor of the VPLMN.

24. A computer program product operable at a network entity configured for use in a wireless communication network, comprising:

a non-transitory computer-readable storage medium comprising:

instructions for causing a computer to store a neighbor database comprising:
PLMN ID information for a plurality of networks; and
neighbor information for each PLMN ID entry in the neighbor database; and instructions for causing a computer to transmit the neighbor database to a user equipment (UE) utilizing one of NAS registration messaging or OMA device management signaling, wherein the instructions for causing a computer to transmit the neighbor database to the UE comprises instructions for causing a computer to enable the UE to determine if a visited public land mobile network (VPLMN) is a neighbor of a home public land mobile network (home PLMN) for the UE, in accordance with the neighbor database, wherein the instructions for causing a computer to enable the UE to determine if the VPLMN is a neighbor of the home PLMN for the UE comprises:

instructions for causing a computer to enable the UE to determine if at least a portion of a PLMN ID of the VPLMN is stored in the neighbor database; and if the portion of the PLMN ID is stored in the neighbor database, instructions for causing a computer to enable the UE to determine if a location identifier of the home PLMN corresponds to a neighbor of the VPLMN.

* * * * *